United States Patent
Takemoto

(10) Patent No.: US 10,191,776 B2
(45) Date of Patent: Jan. 29, 2019

(54) INFORMATION PROCESSING SYSTEM, INFORMATION PROCESSING METHOD, INFORMATION PROCESSING PROGRAM, AND STORAGE MEDIUM

(71) Applicant: FUJIFILM CORPORATION, Minato-ku, Tokyo (JP)

(72) Inventor: Kosei Takemoto, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/903,039

(22) Filed: Feb. 23, 2018

(65) Prior Publication Data
US 2018/0181444 A1 Jun. 28, 2018

Related U.S. Application Data

(63) Continuation of application No. PCT/JP2016/074155, filed on Aug. 18, 2016.

(30) Foreign Application Priority Data

Sep. 10, 2015 (JP) .................. 2015-178715

(51) Int. Cl.
*G06F 9/50* (2006.01)
*G06F 11/34* (2006.01)
(Continued)

(52) U.S. Cl.
CPC .......... *G06F 9/5044* (2013.01); *G06F 9/5038* (2013.01); *G06F 11/3433* (2013.01); *G06F 13/14* (2013.01); *G06F 13/38* (2013.01)

(58) Field of Classification Search
None
See application file for complete search history.

(56) References Cited

U.S. PATENT DOCUMENTS 6,553,476 B1 * 4/2003 Ayaki .................... G06F 3/0601
386/E5.042
7,265,862 B2 * 9/2007 Kurihara ............ H04N 1/00933
358/1.15
(Continued)

FOREIGN PATENT DOCUMENTS

JP 2010-73210 A 4/2010
JP 2010-244096 A 10/2010

OTHER PUBLICATIONS

International Search Report issued in International Application No. PCT/JP2016/074155 dated Oct. 11, 2016.
(Continued)

*Primary Examiner* — Elias Mamo
(74) *Attorney, Agent, or Firm* — SOLARIS Intellectual Property Group, PLLC

(57) ABSTRACT

An information processing system includes a control device that transfers data that is a processing target and a control command, a processing device that is provided outside the control device and performs processing according to the control command after the control command is transferred from the control device, and a planning device that determines a division size of the data such that a difference between a transfer time to transfer divided data from the control device to the processing device and a processing time to process the divided data in the processing device falls within a predetermined range, on the basis of an amount of data, the transfer time, and the processing time, wherein the divided data obtained by dividing the data according to the division size determined by the planning device is transferred to the processing device.

9 Claims, 14 Drawing Sheets

(51) Int. Cl.
    *G06F 13/38*     (2006.01)
    *G06F 13/14*     (2006.01)

(56) References Cited

U.S. PATENT DOCUMENTS

| | | | | |
|---|---|---|---|---|
| 8,913,070 | B2* | 12/2014 | Kawazoe | G06F 3/14 |
| | | | | 345/501 |
| 9,509,517 | B2* | 11/2016 | Kojima | H04W 28/065 |
| 9,733,978 | B2* | 8/2017 | Suarez Gracia | G06F 9/5027 |
| 2011/0208899 | A1* | 8/2011 | Uchida | G06F 12/0246 |
| | | | | 711/103 |

OTHER PUBLICATIONS

Written Opinion of the ISA issued in International Application No. PCT/JP2016/074155 dated Oct. 11, 2016.

\* cited by examiner

INFORMATION PROCESSING SYSTEM, INFORMATION PROCESSING METHOD, INFORMATION PROCESSING PROGRAM, AND STORAGE MEDIUM

CROSS-REFERENCE TO RELATED APPLICATIONS

This application is a continuation application of International Application No. PCT/JP2016/074155, filed on Aug. 18, 2016, which is incorporated herein by reference in its entirety. Further, this application claims priority from Japanese Patent Application No. 2015-178715, filed on Sep. 10, 2015, the disclosure of which is incorporated by reference herein in its entirety.

BACKGROUND

Field of the Invention

The disclosure of Japanese Patent Application No. 2015-178715 filed on Sep. 10, 2015 including the specification, drawings and abstract is incorporated herein by reference in its entirety.

The present disclosure relates to an information processing system, an information processing method, an information processing program, and a storage medium.

Related Art

A technology for causing an external processing device to instead execute data processing to be performed by a control device in order to reduce a load of processing in the control device is generally known. As such a processing device, for example, a device that performs processing using a graphics processing unit (GPU), a digital signal processor (DSP), or the like is known.

Although the GPU is originally intended for image processing, a development environment for use in general purpose calculation is provided in recent years. The GPU can perform numerical calculation at high speed as compared with a central processing unit (CPU).

In many cases, the GPU is an external discrete device that is controlled by the control device. Therefore, in order to cause the GPU to perform a process for data that is a processing target, the data that is a processing target is transferred from the control device to the GPU via an external bus and processed data obtained through the process is transferred to the control device in many cases.

For example, JP2010-244096A describes a technology for transferring divided data obtained by dividing data that is a processing target by a predetermined number of divisions from a CPU to a GPU, and processing the divided data in the GPU. In the technology described in JP2010-244096A, a total time taken to process the data that is a processing target is shortened by executing the transfer of the divided data from the CPU to the GPU and processing of the divided data in the GPU in parallel.

However, in a case where a processing device outside a control device is caused to perform processing of data, when divided data divided by the predetermined number of divisions is simply transferred from the control device to the processing device, and the processing device repeats an operation of processing the divided data, a transfer time may be disturbed (so-called bottleneck), and a time from start of processing for data that is a processing target to completion (hereinafter referred to as a "total processing time") may be longer.

In the technology described in the above document, since the data that is a processing target is divided by a predetermined number of divisions, a total processing time may be longer as described above. This is not limited to a case where the processing device uses a GPU, and may also occur in a case where a device using another discrete device that executes image processing and a calculation process, such as a DSP and a product name XEON PHI (registered trademark) manufactured by Intel Corporation, is applied as the processing device.

SUMMARY

The present disclosure has been made in view of the above facts, and provides an information processing system, an information processing method, an information processing program, and a storage medium capable of effectively shortening time required in a case where a process is executed outside a control device.

A first aspect of the present disclosure is an information processing system comprising: a control device that transfers data that is a processing target and a control command describing processing content for the data; at least one processing device that is provided outside the control device and perform processing according to the control command on the data in a case where the control command is transferred from the control device; and a planning device that determines a division size of the data such that a difference between a transfer time to transfer divided data obtained by dividing the data from the control device to the processing device and a processing time to process the divided data in the processing device falls within a predetermined range, on the basis of an amount of the data, the transfer time, and the processing time, wherein the control device sequentially transfers the divided data obtained by dividing the data according to the division size determined by the planning device to the processing device, and the processing device performs processing according to the corresponding control command on the previously transferred divided data in parallel with the transfer of the divided data from the control device to the processing device in a case where the control command is transferred from the control device.

The planning device of the information processing system of this aspect may determine the division size to be a minimum value in a case where the determined division size is smaller than a predetermined minimum value.

In the information processing system of this aspect, plural processing devices may be provided each having the transfer time and the processing time determined in advance, and the planning device may determine the division size for each of the plural processing devices, calculate a processing completion time from start of transfer of the divided data from the control device to each of the plural processing devices to end of transfer of all pieces of data obtained by processing the divided data from each of the plural processing devices to the control device on the basis of the determined division size, and determine a processing device having a shortest processing completion time to be a transfer destination of the divided data of the control device.

The planning device of the information processing system of this aspect may determine the division size to be a minimum value in a case where the determined division size is smaller than a predetermined minimum value, for each of the processing devices.

The processing device of the information processing system of this aspect may transfer the processed data obtained through the processing to the control device, and the planning device may determine a division size of the data in which a difference between the transfer time of the processed data and the processing time falls within a predetermined range in a case where a transfer time of the processed data from the processing device to the control device is longer than a transfer time to transfer the divided data from the control device to the processing device.

The control device of the information processing system of this embodiment may be a central processing unit (CPU), and the processing device may be a graphics processing unit (GPU).

The divided data of the information processing system of this aspect may be transferred from the control device to the processing device by direct memory access (DMA).

The planning device of the information processing system of this aspect may be included in the control device.

A second aspect of the present disclosure is an information processing method comprising: transferring, by a control device, data that is a processing target and a control command describing processing content for the data; performing, by a processing device that is provided outside the control device, processing according to the control command on the data in a case where the control command is transferred from the control device; and determining, by a planning device, a division size of the data such that a difference between a transfer time to transfer divided data obtained by dividing the data from the control device to the processing device and a processing time to process the divided data in the processing device falls within a predetermined range, on the basis of an amount of the data, the transfer time, and the processing time, and comprising sequentially transferring, by the control device, the divided data obtained by dividing the data according to the division size determined by the planning device to the processing device, and performing, by the processing device, processing according to the corresponding control command on the previously transferred divided data in parallel with the transfer of the divided data from the control device to the processing device in a case where the control command is transferred from the control device.

A third aspect of the present disclosure is an information processing method comprising: determining, by a planning device, a division size of data that is a processing target such that a difference between a transfer time to transfer divided data obtained by dividing the data from a control device to a processing device provided outside the control device and a processing time to process the divided data in the processing device falls within a predetermined range, on the basis of an amount of the data, the transfer time, and the processing time; sequentially transferring, by the control device, the divided data obtained by dividing the data according to the division size determined by the planning device and a control command describing processing content for the data to the processing device; and performing, by the processing device, processing according to the corresponding control command on the previously transferred divided data in parallel with the transfer of the divided data from the control device to the processing device in a case where the control command is transferred from the control device.

A fourth aspect of the present disclosure is an information processing program that causes a computer to function as the planning device of the information processing system of the first aspect.

A fifth aspect of the present disclosure is a non-transitory computer-readable storage medium that stores a program causing a computer to execute information processing, the information processing comprising: receiving an amount of data that is a processing target and processing content for the data from a control device; determining a division size of divided data obtained by dividing the data on the basis of a transfer time to transfer the amount of data from the control device to a processing device provided outside the control device and a processing time to execute the processing content for the amount of data, the division size being a size such that a difference between a transfer time to transfer the divided data from the control device to the processing device and a processing time to process the divided data in the processing device falls within a predetermined range; and outputting the division size to the control device.

The technology of the present disclosure provides an information processing system, an information processing method, an information processing program, and a storage medium capable of effectively shortening a time required in a case where processing is executed outside a control device.

DETAILED DESCRIPTION

Hereinafter, embodiments will be described in detail with reference to the drawings. This embodiment does not limit the present disclosure.

First Embodiment

Figure 1:
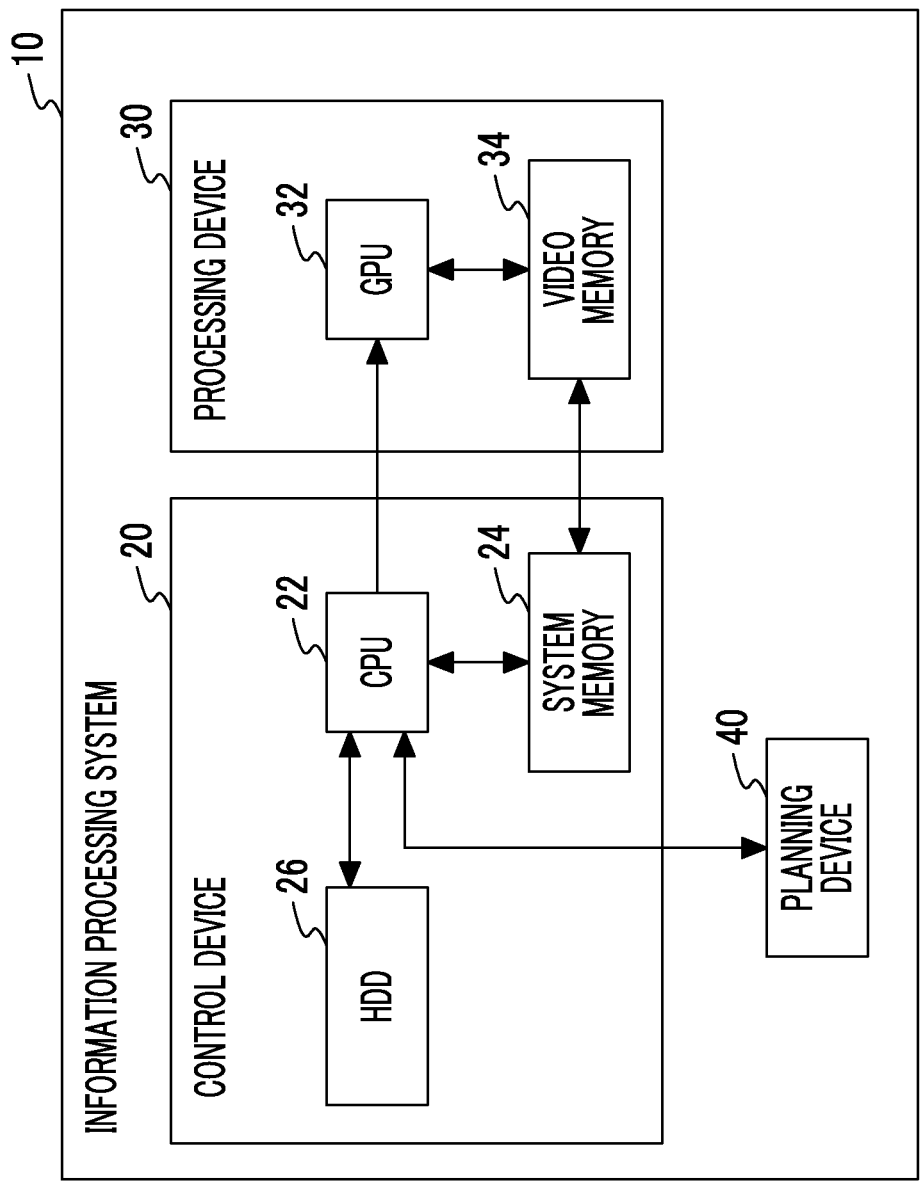
FIG. 1 is a block diagram illustrating a configuration example of an information processing system according to a first embodiment.

First, an information processing system of this embodiment will be described. As illustrated in FIG. 1, an information processing system 10 of this embodiment includes a control device 20, a processing device 30, and a planning device 40.

The control device 20 includes a CPU 22, a system memory 24, and a hard disk drive (HDD) 26 that stores various pieces of information.

The CPU 22 totally controls the entire control device 20, for example, by executing various processes using predetermined data. Further, the CPU 22 of this embodiment divides the data that is a processing target into a size according to a division size to be described later, which is input from the planning device 40 to generate divided data. Further, the CPU 22 according to this embodiment transfers the generated divided data, and a control command describing processing content for the divided data to a graphics processing unit (GPU) 32 of the processing device 30 to be described later.

The system memory 24 is a memory that is used in a case where various processes are executed by the CPU 22, and stores the divided data, data transferred from the processing device 30 obtained by performing processing on the divided data in the GPU 32 of the processing device 30 (hereinafter referred to as "processed data"), and the like.

Meanwhile, the GPU 32 of the processing device 30 of this embodiment performs processing on data that is a processing target (strictly, divided data) instead of the CPU 22 of the control device 20. The processing device 30 of this embodiment includes the GPU 32 and a video memory 34.

The GPU 32 totally controls the entire processing device 30. Further, in a case where the GPU 32 according to this embodiment receives a control command from the CPU 22, the GPU 32 performs processing indicated by the control command on the divided data received together with the control command asynchronously with the CPU 22. A type of processing that the GPU 32 executes in place of the CPU 22 is not limited, but examples thereof may include processing regarding image processing (a color space conversion process, an image compression process, or the like), a numerical calculation process, and audio processing. As such a GPU 32, a GPU corresponding to a general-purpose computing on graphics processing units (GPGPU) is preferable.

The video memory 34 is a memory that is used in a case where processing for data is executed by the GPU 32, and stores the divided data received from the control device 20, the above-described processed data, and the like. In the information processing system according to this embodiment, data transfer between the system memory 24 of the control device 20 and the video memory 34 of the processing device 30 is performed by direct memory access (DMA).

The processing device 30 according to this embodiment can perform processing for the divided data using the GPU 32 and data transfer from and to the control device 20 (reception of the divided data from the control device 20 and transmission of the processed data to the control device 20) in parallel. Further, the processing device 30 can perform, as the data transfer, the reception of the divided data from the control device 20 and the transmission of the processed data to the control device 20 in parallel.

Figure 2:
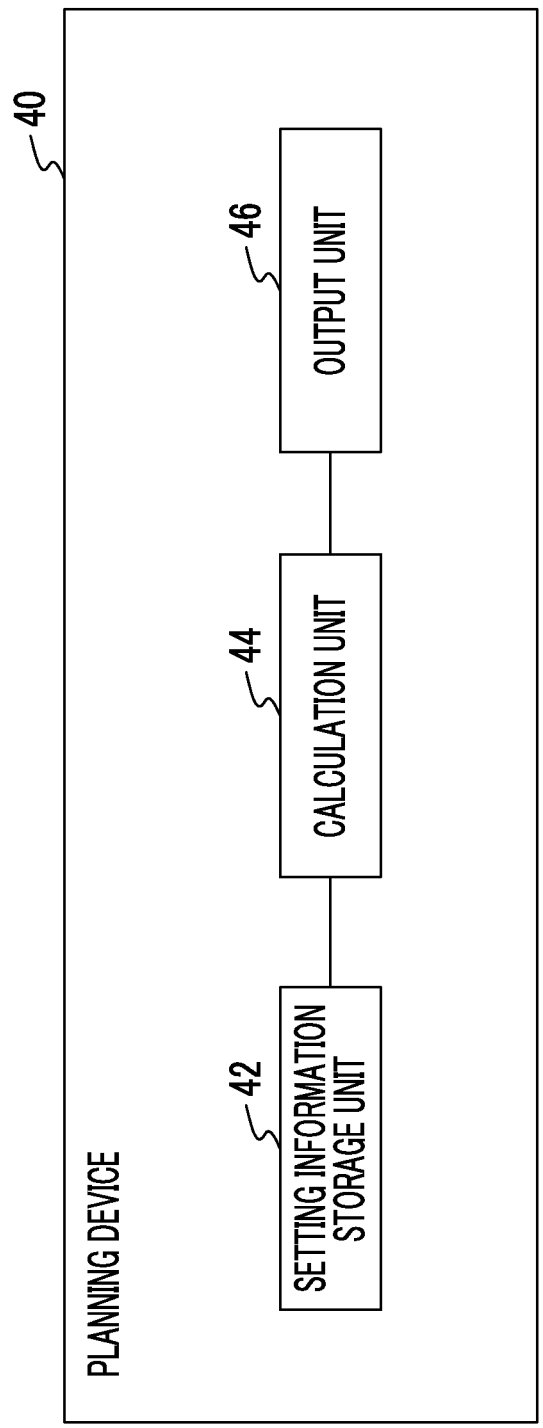
FIG. 2 is a block diagram illustrating a configuration example of a planning device according to a first embodiment.

The planning device 40 according to this embodiment is device that determines a division size in which a difference between a transfer time to transfer the divided data from the control device 20 to the processing device 30 and a processing time to process the divided data in the processing device 30 falls within a predetermined range, on the basis of the amount of data that is a processing target, the transfer time, and the processing time. As illustrated in FIG. 2, the planning device 40 of this embodiment includes a setting information storage unit 42, a calculation unit 44, and an output unit 46.

In the information processing system 10 according to this embodiment, any one of a plurality of types of GPUs having different specifications is selectively adopted as the GPU 32 that is used in the processing device 30 according to a use, required performance, or the like of the information processing system 10. In the planning device 40 according to this embodiment, an optimum division size according to the type of the GPU 32 adopted in the processing device 30 is derived through calculation in the calculation unit 44.

Therefore, in the setting information storage unit 42 of the planning device 40 according to this embodiment, setting information including various pieces of data used for calculation of the division size in the calculation unit 44 is stored in advance for each type of the GPU 32 that can be adopted in the processing device 30.

Figure 3:
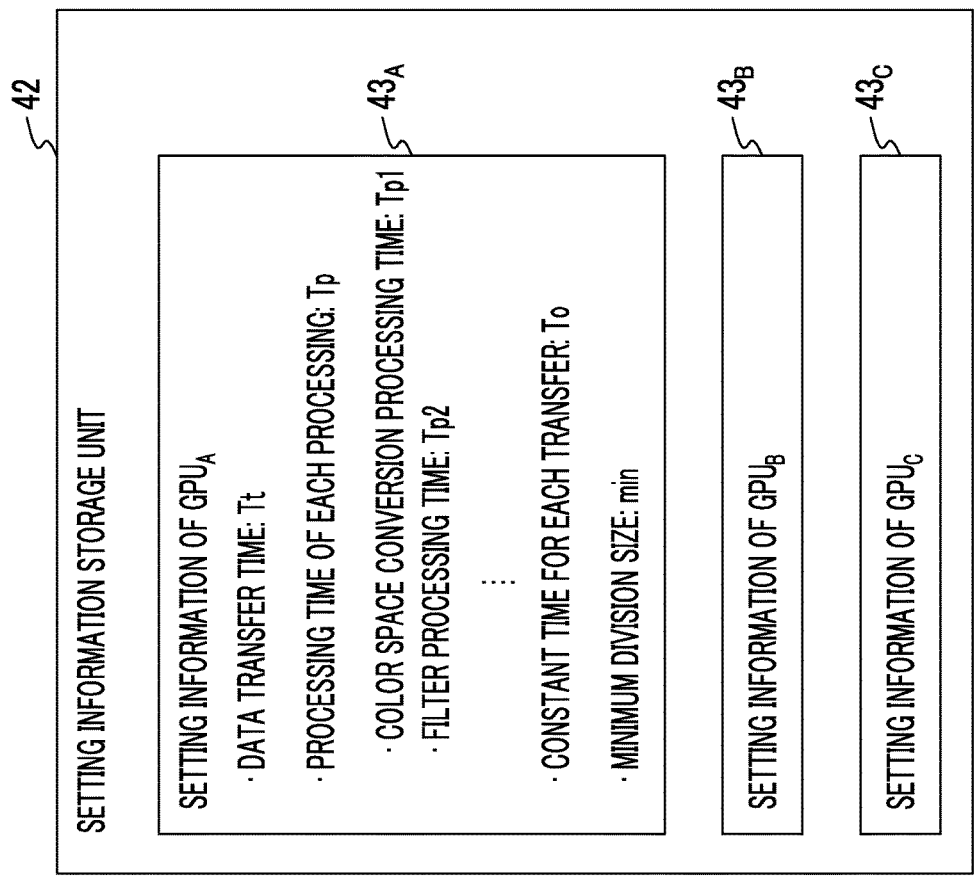
FIG. 3 is a schematic diagram illustrating an example of design information according to the first embodiment.

In the information processing system 10 according to this embodiment, three types of GPUs 32 (hereinafter referred to as "$GPU_A$", "$GPU_B$", and "$GPU_C$") are assumed as types of the GPU 32 that can be adopted in the processing device 30. Therefore, in the information processing system 10 according to this embodiment, for example, the setting information $43_A$, $43_B$, and $43_C$ corresponding to the respective corresponding GPUs 32 are stored in the setting information storage unit 42 in advance, as illustrated in FIG. 3. Hereinafter, the setting information $43_A$, $43_B$, and $43_C$ are collectively referred to as "setting information 43" unless it is particularly necessary to distinguish and describe the setting information $43_A$, $43_B$, and $43_C$. Further, the number of types of the GPU 32 that can be adopted in the processing device 30 is not limited to three.

As illustrated in FIG. 3, the setting information 43 according to this embodiment includes a data transfer time Tt, a processing time Tp of each processing, a constant time To per transfer, and a minimum division size min.

The data transfer time Tt is a time required for transfer of a predetermined amount of data between the control device 20 (more specifically, the system memory 24) and the processing device 30 (more specifically, the video memory 34). In this embodiment, a case where a data transfer time from the system memory 24 to the video memory 34 and a data transfer time from the video memory 34 to the system memory 24 include a range of error and are the same in order to avoid confusion will be described.

The processing time Tp of each processing is a time required for processing of a predetermined amount of data for each piece of processing content that is executed by the corresponding GPU 32. In FIG. 3, a color space conversion processing time Tp1 and a filter processing time Tp2 are shown as specific examples of the processing time Tp. Examples of the color space conversion process include a color space conversion process from a RGB color space to a YCbCr color space and a color space conversion process from the RGB color space to an HSV color space. Examples of filter processing include filter processing using a convolution filter and filter processing using a median filter. The type of processing that is executed by the GPU 32 is not limited to the above. Examples of other types of processing in a case where the data that is a processing target is image data include general-purpose processing such as an image size change process (so-called expansion process and reduction process), a transposition process, a rotation process, a vertical coupling process, a horizontal coupling process, and a color conversion process using a look-up table (LUT). Further, examples of types of the above process include a reduction process, such as a process of calculating a maximum value, a process of calculating a minimum value, a process of calculating an average value, and a process of calculating a histogram.

The constant time To for each transfer is so-called overhead caused by transferring data between the control device 20 and the processing device 30.

Figure 4:
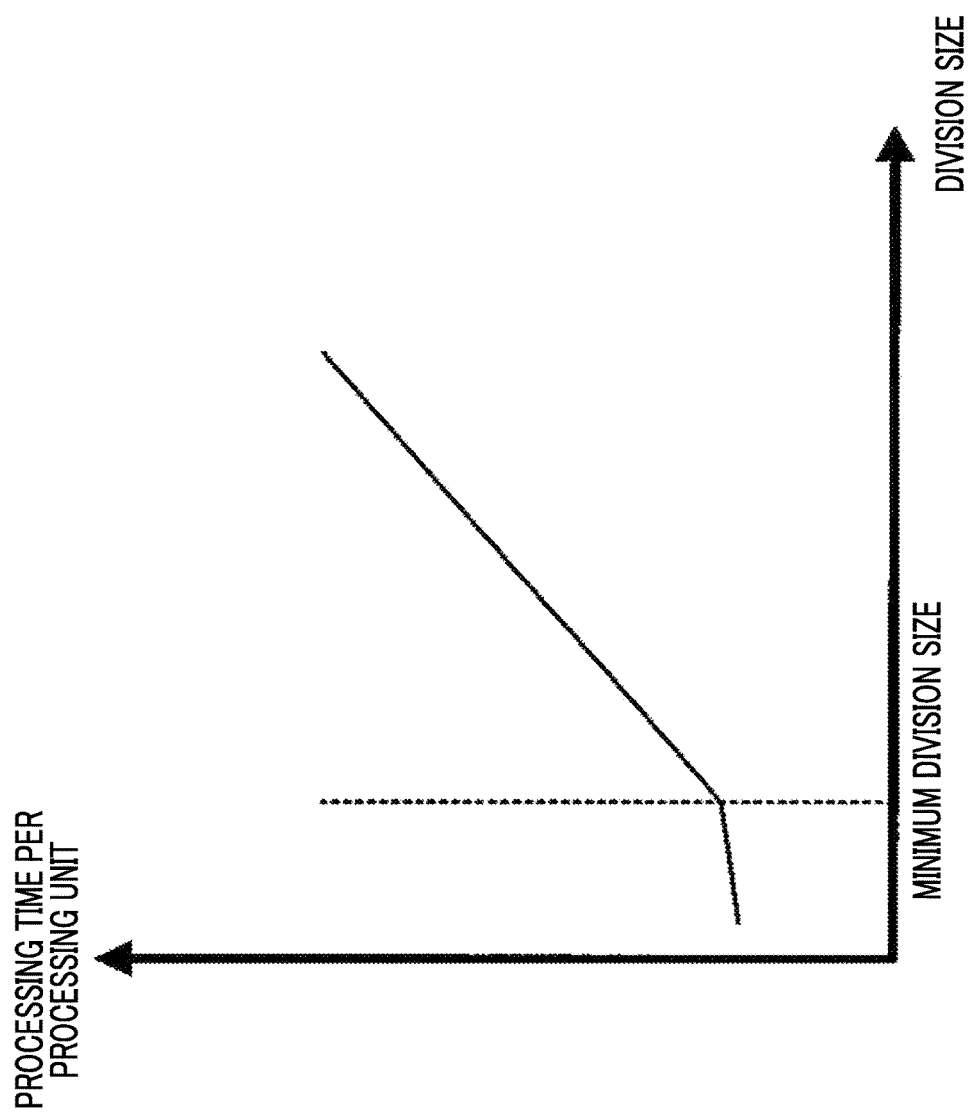
FIG. 4 is a graph showing an example of a correspondence relationship between a processing time per processing unit and a division size in a processing device (GPU) according to the first embodiment.

The minimum division size min is a lower limit value of the size of the divided data on which the GPU 32 performs processing. Generally, it is known that data of a certain size is required to realize a high-speed parallel processing function in the GPU 32. FIG. 4 illustrates an example of a correspondence relationship between a processing time per processing unit and a division size in the processing device 30 (GPU 32). In FIG. 4, "one processing unit" refers to a "predetermined amount" of a "predetermined amount of data" in the description of the setting information. As illustrated in FIG. 4, in a case where the division size is smaller than the minimum division size, the processing time hardly changes (at least as compared with a case where the division size is greater than the minimum division size) even in a case where the division size becomes small. That is, in a case where the division size is smaller than the minimum division size, it is understood that the GPU 32 cannot exhibit the high-speed parallel processing function. Therefore, in the information processing system 10 according to this embodiment, the minimum division size min is determined according to the performance of the GPU 32 in advance.

On the basis of the setting information 43 stored in the setting information storage unit 42, the calculation unit 44 calculates a division size of the data that is a processing target in which a difference between the transfer time to transfer the divided data from the control device 20 to the processing device 30 and the processing time to process the divided data in the processing device 30 is within a predetermined range. Here, the "predetermined range" specifically is a range that is determined according to, for example, the processing speed required for the information processing system 10 in advance, and is preferably a range in which the transfer time and the processing time can be considered to be equal to each other.

The output unit 46 outputs the division size calculated by the calculation unit 44 to the CPU 22 of the control device 20.

Figure 5:
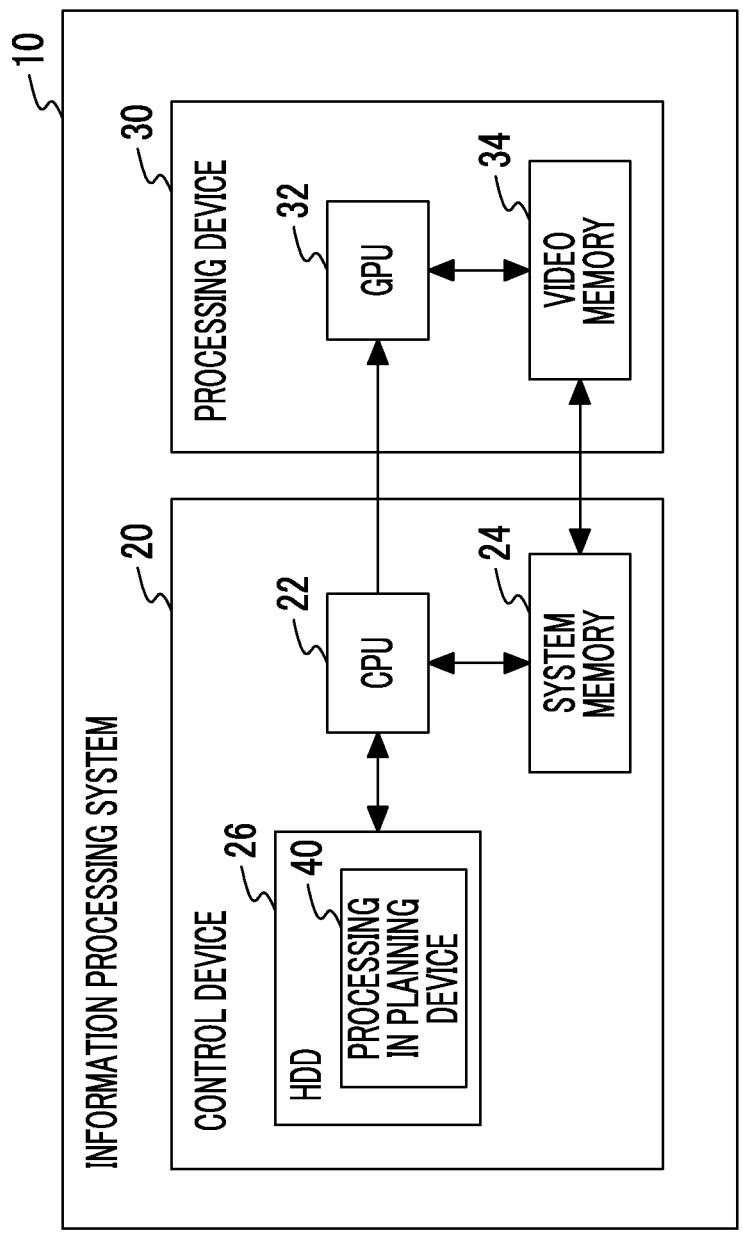
FIG. 5 is a block diagram illustrating a configuration example of an information processing system in a case where the planning device is configured as software.

In this embodiment, the planning device 40 is configured by hardware, but the present invention is not limited thereto, and the planning device 40 may be configured by software (program). In this case, for example, as illustrated in FIG. 5, a form in which the processing executed in the planning device 40 is stored as software in the HDD 26 of the control device 20 is conceivable.

Figure 6:
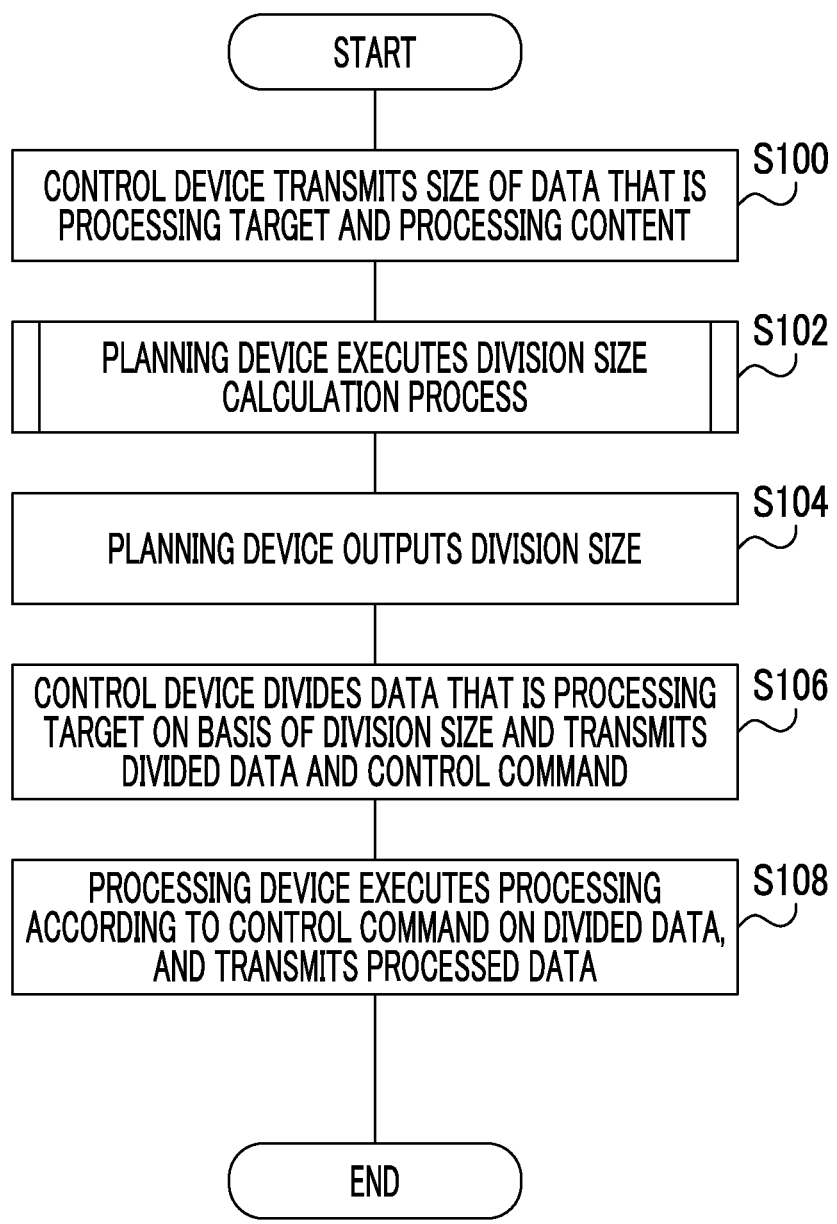
FIG. 6 is a flowchart illustrating an example of a flow of an overall operation of the information processing system according to the first embodiment.

Next, an operation of the information processing system 10 of this embodiment will be described. First, a flow of the overall operation of the information processing system 10 will be described with reference to FIG. 6.

First, in step S100, the control device 20 outputs a size of the data that is a processing target and processing content (type of processing) to the planning device 40. In the information processing system 10 according to this embodiment, the control device 20 also outputs information for specifying a type of the GPU 32 of the processing device 30 that performs processing to the planning device 40.

When the size of the data that is a processing target, the processing content, and the information for specifying a type of the GPU 32 are input to the planning device 40, the planning device 40 executes the division size calculation process which will be described in detail to determine an optimum division size through calculation in the next step S102.

In the next step S104, the planning device 40 outputs the determined division size to the control device 20.

Figure 7:
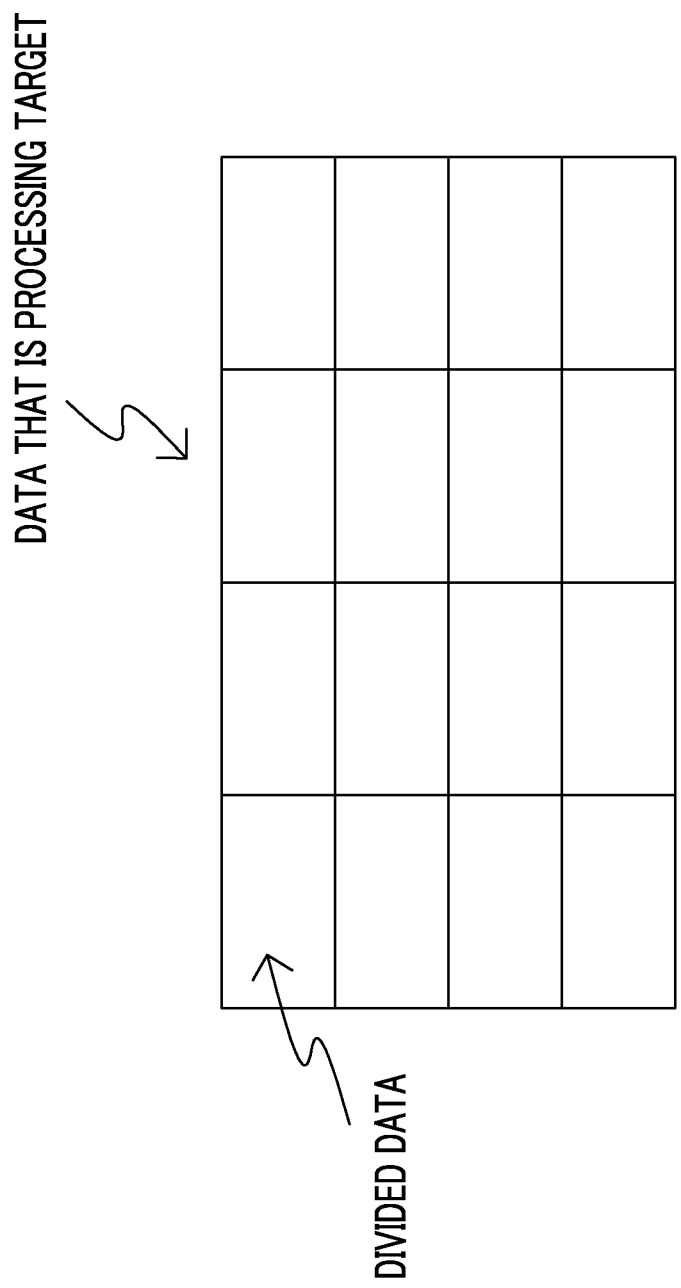
FIG. 7 is a diagram provided for description of a dividing procedure of data that is a processing target.

In the next step S106, the control device 20 divides the data that is a processing target on the basis of the division size input from the planning device 40, and sequentially transmits obtained divided data and a control command to the processing device 30 for each obtained divided data. Here, a method by which the control device 20 divides the data that is a processing target is not particularly limited, and the data may be divided using a method according to content of processing, a type of data that is a processing target, or the like. For example, in a case where the data that is a processing target is image data of a two-dimensional raster format image, for example, the data may be divided into a plurality of regions having a rectangular shape and the same areas (4×4=16 in FIG. 7), as illustrated in FIG. 7. A method of dividing the data that is a processing target is not limited thereto. For example, the data that is a processing target may be divided into image data of images having a rectangular shape and the same area aligned in one predetermined direction.

In the next step S108, the processing device 30 performs processing according to the corresponding control command on the divided data sequentially received from the control device 20, sequentially transmits the obtained processed data to the control device 20, and ends a series of operations in the information processing system 10.

In the information processing system 10 of this embodiment, the processing for the divided data in the processing device 30 and the transfer of the processed data from the processing device 30 to the control device 20 are performed in parallel.

Figure 8:
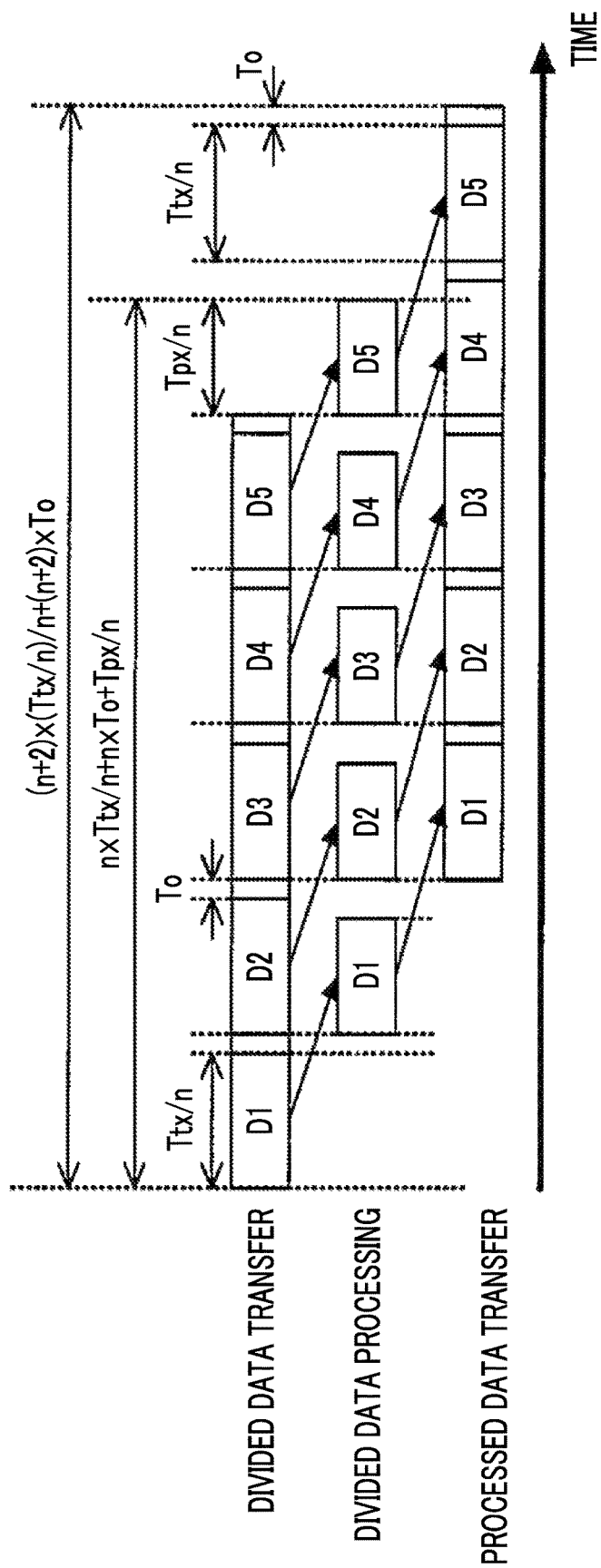
FIG. 8 is a timing chart showing an example of a transfer period of divided data, an execution period of processing for divided data, and a transfer period of processed data in a case where data that is a processing target is divided and transferred.

FIG. 8 illustrates an example of a timing chart between a transfer period of the divided data, an execution period of the processing for the divided data, and a transfer period of the processed data in a case where the data that is a processing target is divided and transferred. In the example illustrated in FIG. 8, a case where transfer of divided data, execution of processing, and transfer of processed data are sequentially performed on divided data D1 to D5 obtained by dividing data that is a processing target into five pieces of data is shown.

As illustrated in FIG. 8, in the information processing system 10 of this embodiment, for example, transfer of divided data D3 from the control device 20 to the processing device 30, processing for divided data D2 in the processing device 30, and transfer of the processed data D1 (processed data obtained by processing the divided data D1) from the processing device 30 to the control device 20 are performed in parallel.

Next, the division size calculation process that is executed by the planning device 40 in a process of step S102 of the overall operation of the information processing system 10 will be described with reference to FIG. 9.

Figure 9:
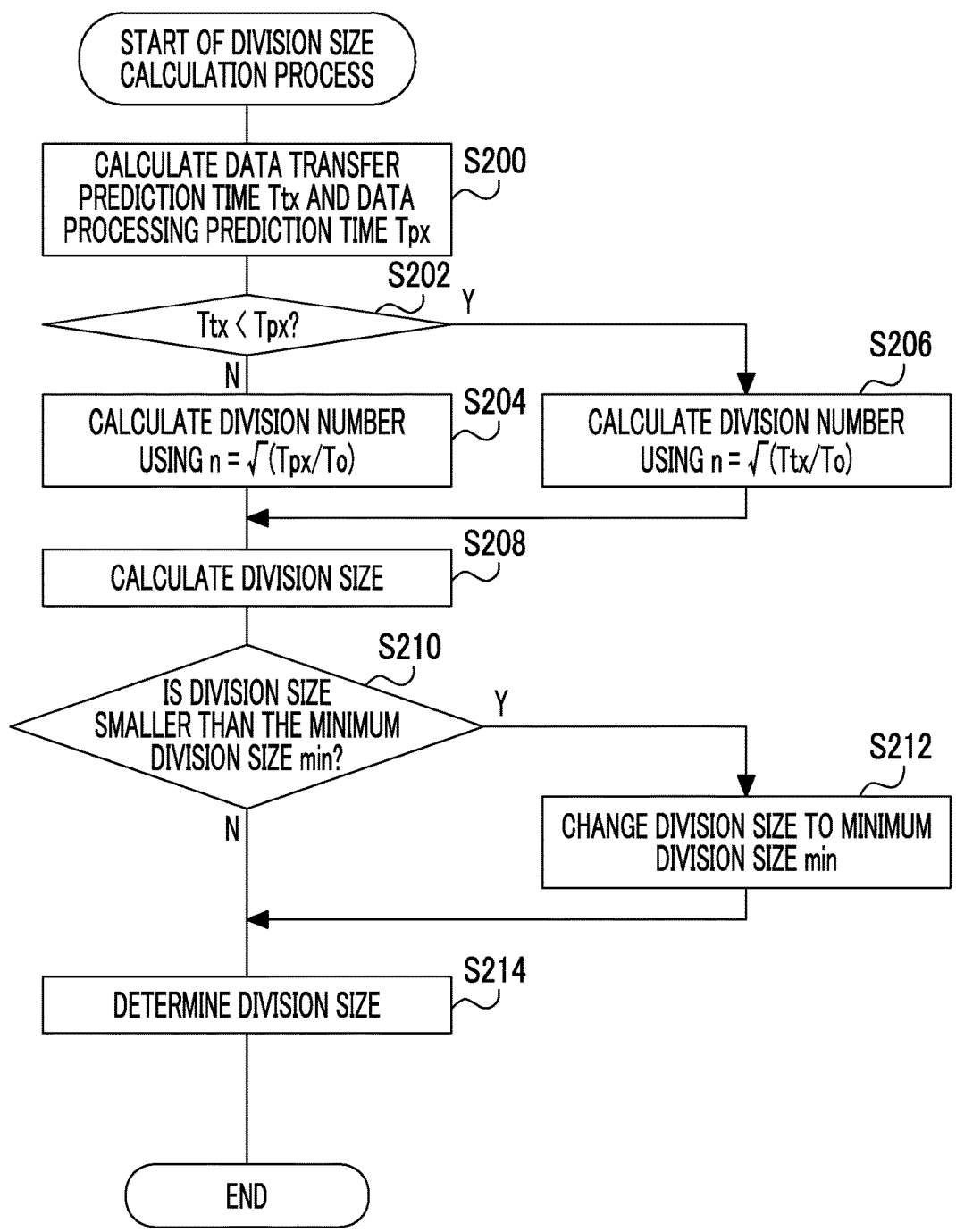
FIG. 9 is a flowchart illustrating an example of a flow of division size calculation process that is executed by a calculation unit of the planning device according to the first embodiment.

In step S200 of FIG. 9, the calculation unit 44 calculates a data transfer prediction time Ttx and a data processing prediction time Tpx for the entire data that is a processing target. Specifically, the calculation unit 44 refers to the setting information 43 stored in the setting information storage unit 42 according to the information specifying the GPU 32, and reads the data transfer time Tt and the processing time Tp according to processing content. The data transfer prediction time Ttx and the data processing prediction time Tpx are calculated on the basis of the read data transfer time Tt, the read processing time Tp, and the size of the data that is a processing target.

Figure 10:
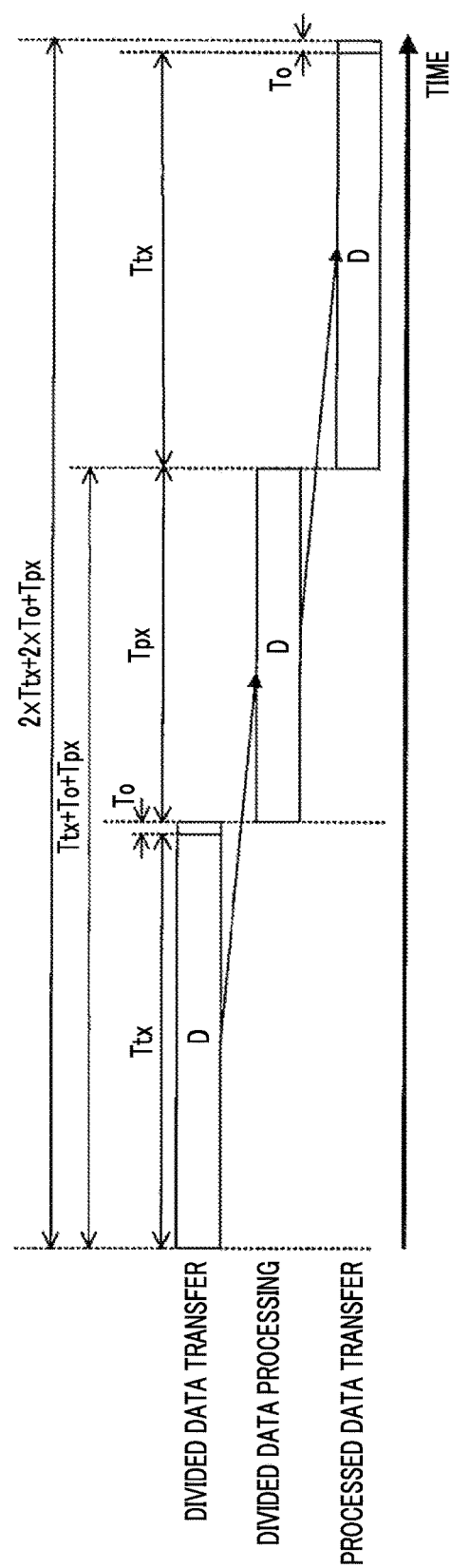
FIG. 10 is a timing chart showing an example of a transfer period of data that is a processing target, an execution period of processing for the data that is a processing target, and a transfer period of processed data in a case where the data that is a processing target is not divided.

For example, in a case where data is transferred to the processing device 30 and processed by the processing device 30 without dividing the data that is a processing target, a total processing time from start of the transfer of the data D of processing target in the control device 20 to completion of processing for the data D that is a processing target in the processing device 30 is a time obtained by adding the data transfer prediction time Ttx, the constant time To, and the data processing prediction time Tpx (Ttx+To+Tpx), as illustrated in FIG. 10. A total processing time of the data that is a processing target is strictly a time from the start of the transfer of the data D that is a processing target in the control device 20 to completion of the transfer of the processed data obtained by the processing device 30 processing the data D that is a processing target to the control device 20. However, the transfer of the processed data may not be performed in parallel with the transfer of the divided data from the control device 20 to the processing device 30 and the processing for the divided data in the processing device 30. Therefore, in the information processing system 10 according to this embodiment, in order to avoid complicated processing, a period from the start of the transfer of data that is a processing target to the processing device 30 to the completion of the processing in the processing device 30 is regarded as a total processing time, and the calculation of the division size is performed. Similarly, even in a case where the processing device 30 processes the divided data, a period from the start of the transfer of the data that is a processing target to the processing device 30 to the completion of the processing in the processing device 30 is regarded as the total processing time.

Then, in step S202, the calculation unit 44 determines whether the data processing prediction time Tpx is longer than the data transfer prediction time Ttx (Ttx<Tpx). In a case where a negative determination is made here (in a case where the data transfer prediction time Ttx is equal to or longer than the data processing prediction time Tpx, that is, Ttx≥Tpx), the process proceeds to step S204.

The example illustrated in FIG. 8 is a case where the data transfer prediction time Ttx is equal to or longer than the data processing prediction time Tpx. In the case of the example illustrated in FIG. 8, a total processing time from start of transfer of the first divided data D1 in the control device 20 to completion of processing of the last divided data D5 in the processing device 30 is expressed by Equation (1) below in a case wherein the number of divisions is set to n (N=5 in the example illustrated in FIG. 8).

[Equation 1]

$$\text{Total processing time} = n \times \frac{Ttx}{n} + n \times To + \frac{Tpx}{n} \quad (1)$$
$$= Ttx + n \times To + \frac{Tpx}{n}$$

On the basis of arithmetic-geometric mean, an optimum number of divisions n is obtained by Equation (2) below from the Equation (1). According to Equation (2), the transfer time of the divided data from the control device 20 to the processing device 30 and the processing time of processing of the divided data in the processing device 30 become equal.

[Equation 2]

$$n = \sqrt{\frac{Tpx}{To}} \quad (2)$$

Therefore, in step S204, the calculation unit 44 calculates the number of divisions n using Equation (2) and then proceeds to step S208.

On the other hand, in a case where the data processing prediction time Tpx is longer than the data transfer prediction time Ttx (Ttx<Tpx), a positive determination is made in step S202 and the process proceeds to step S206.

Figure 11:
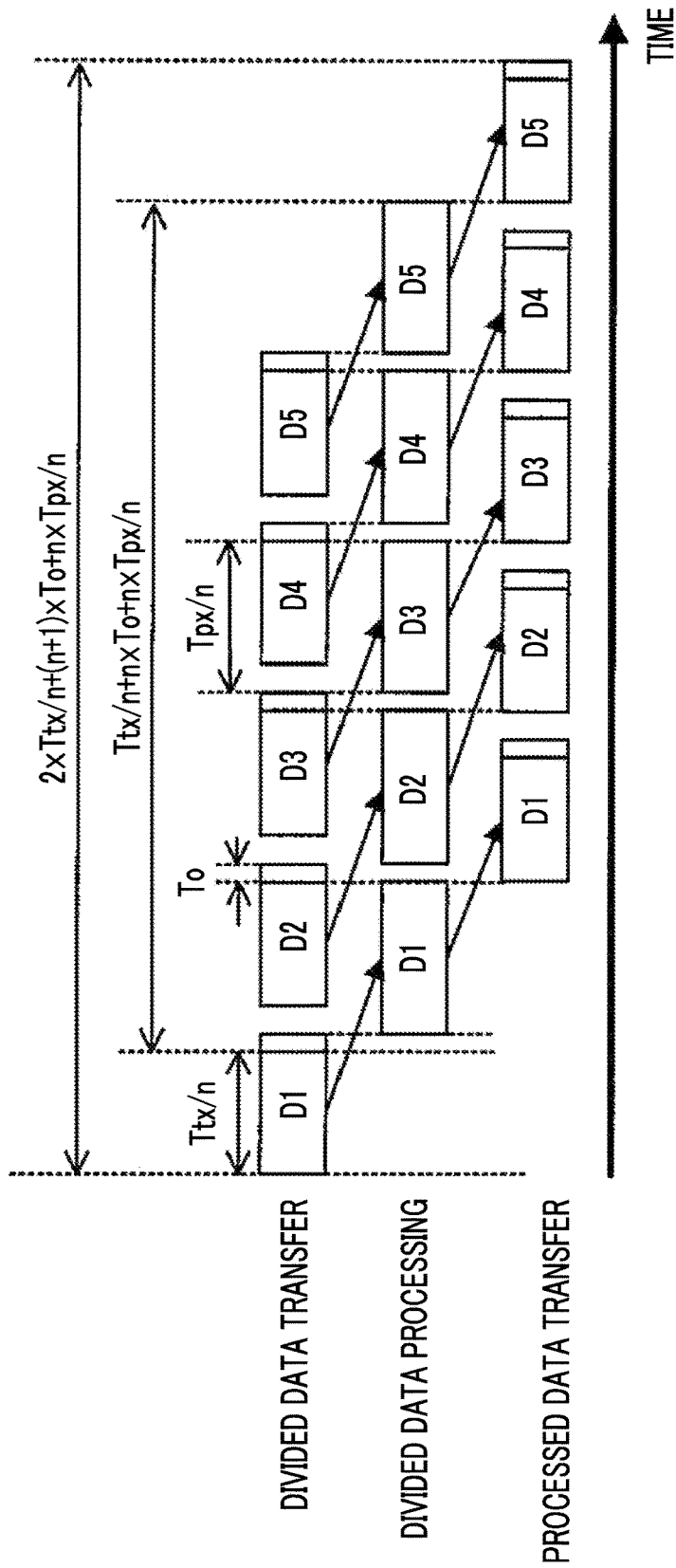
FIG. 11 is a timing chart showing an example of a transfer period of divided data, an execution period of processing for divided data, and a transfer period of processed data in a case where data that is a processing target is divided and transferred.

The example illustrated in FIG. 11 is a case where the data processing prediction time Tpx is longer than the data transfer prediction time Ttx. In the case illustrated in FIG. 11, a total processing time from the start of the transfer of first divided data (D1) in the control device 20 to the completion of the processing of the last divided data (D5) in the processing device 30 becomes Equation (3) below in a case where the number of divisions is n (n=5 in FIG. 11).

[Equation 3]

$$\text{Total processing time} = \frac{Ttx}{n} + n \times To + n \times \frac{Tpx}{n} \quad (3)$$
$$= \frac{Ttx}{n} + n \times To + Tpx$$

On the basis of the arithmetic-geometric mean, the optimum number of divisions n can be obtained from Equation (4) below from Equation (3). According to Equation (4), the transfer time of the divided data from the control device 20 to the processing device 30 and the processing time of processing of the divided data in the processing device 30 become further equal to each other.

[Equation 4]

$$n = \sqrt{\frac{Ttx}{To}} \quad (4)$$

Therefore, in step S206, the calculation unit 44 calculates the number of divisions n using Equation (4), and then, proceeds to step S208.

In step S208, the calculation unit 44 calculates the division size. Specifically, the division size is calculated by dividing the data amount of the data that is a processing target by the division size. In a case where the calculation result is not divisible, the calculation result may be rounded to a value of an integer using a predetermined method such as rounding off, rounding up, and truncation.

In the next step S210, the calculation unit 44 determines whether or not the calculated division size is smaller than the minimum division size min. In a case where the division size is equal to or larger than the minimum division size min, a negative determination is made and the process proceeds to step S214.

On the other hand, in a case where the division size is smaller than the minimum division size min, a positive determination is made, and the process proceeds to step S212. In step S212, the division size is changed from the calculated division size to the minimum division size min, and the process proceeds to step S214. Thus, in a case where the division size is smaller than the minimum division size min, the GPU 32 of the processing device 30 can sufficiently exhibit the high-speed parallel processing function by setting the division size to the minimum division size min, and therefore, it is possible to effectively shorten the total processing time.

In step S214, the output unit 46 outputs the division size obtained by the above processing to the control device 20, and then ends this division size calculation process.

As described above, the control device 20 divides the data that is a processing target on the basis of the division size input from the planning device 40 in the process of step S106 of the overall operation (see FIG. 6) of the information processing system 10, and outputs the divided data and the control command to the processing device 30.

Second Embodiment

Next, a second embodiment will be described. The same parts as those of the information processing system 10 according to the first embodiment are denoted with the same reference numerals, and a detailed description thereof will be omitted.

Figure 12:
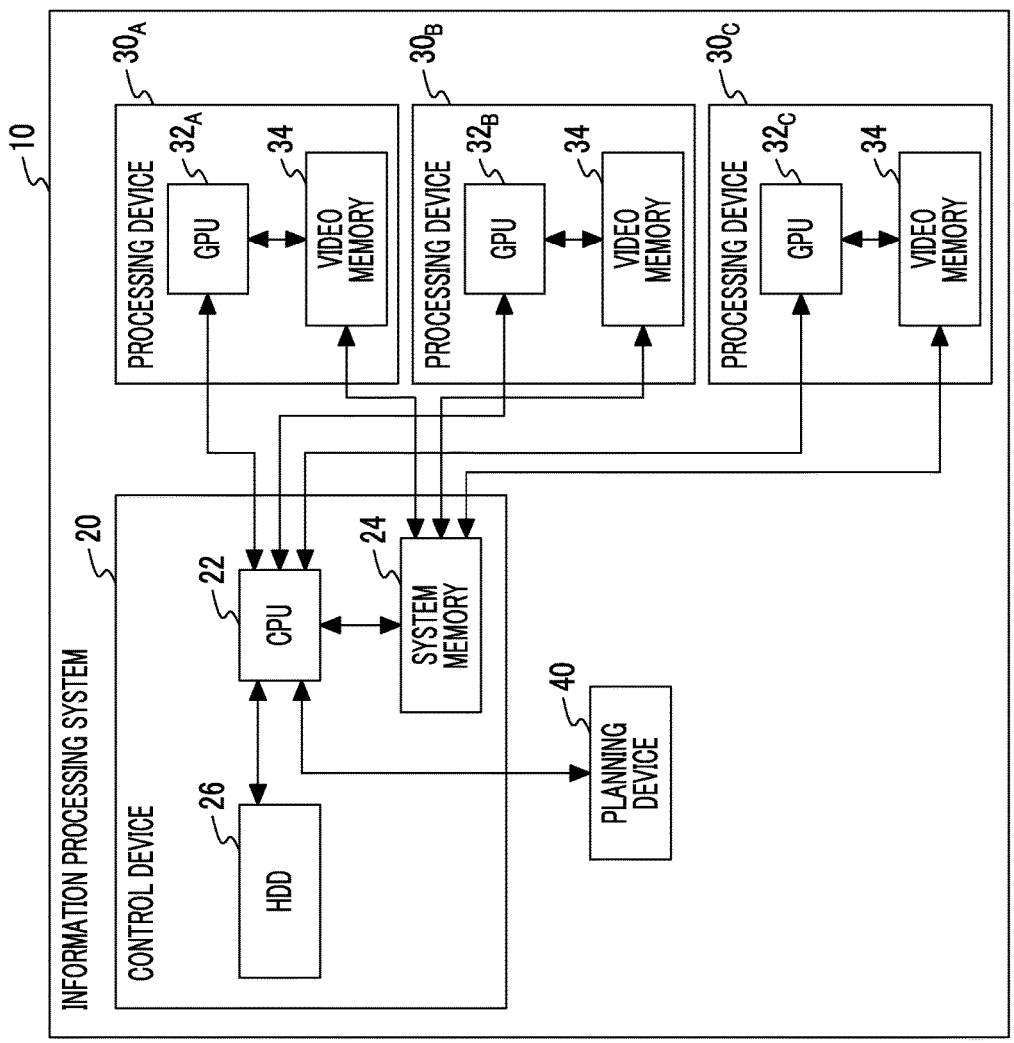
FIG. 12 is a block diagram illustrating a configuration example of an information processing system according to a second embodiment.

First, the information processing system of this embodiment will be described. As illustrated in FIG. 12, the information processing system 10 of this embodiment is different from the information processing system 10 of the first embodiment (see FIG. 1) in that processing devices $30_A$, $30_B$, and $30_C$ are included and connected to the control device 20. The processing devices $30_A$, $30_B$, and $30_C$ include different types of GPUs $32_A$, $32_B$, and $32_C$ and video memories 34, respectively. Hereinafter, the processing devices $30_A$, $30_B$, and $30_C$ are generically referred to as a "processing device 30" unless it is particularly necessary to distinguish and describe the processing device $30_A$, $30_B$, and $30_C$. Similarly, the GPUs $32_A$, $32_B$, and $32_C$ are collectively referred to as a "GPU 32" unless it is particularly necessary to distinguish and describe the GPUs $32_A$, $32_B$, and $32_C$. Further, the number of processing devices 30 that can be included in the information processing system 10 is not limited to three.

Further, configurations of the control device 20 and the planning device 40 are the same as those of the planning device 40 of the first embodiment, but setting information 43 regarding the GPUs 32 of all the processing devices 30 included in the information processing system 10 is stored in the setting information storage unit 42 of the planning device 40.

Next, an operation of the information processing system 10 of this embodiment will be described. Since a flow of an overall operation of the information processing system 10 is the same as that of the first embodiment (see FIG. 6), a description thereof will be omitted. In this embodiment, since a part of the division size calculation process that is performed by the planning device 40 is different from that of the first embodiment, a different process will be described with reference to FIG. 13.

Figure 13:
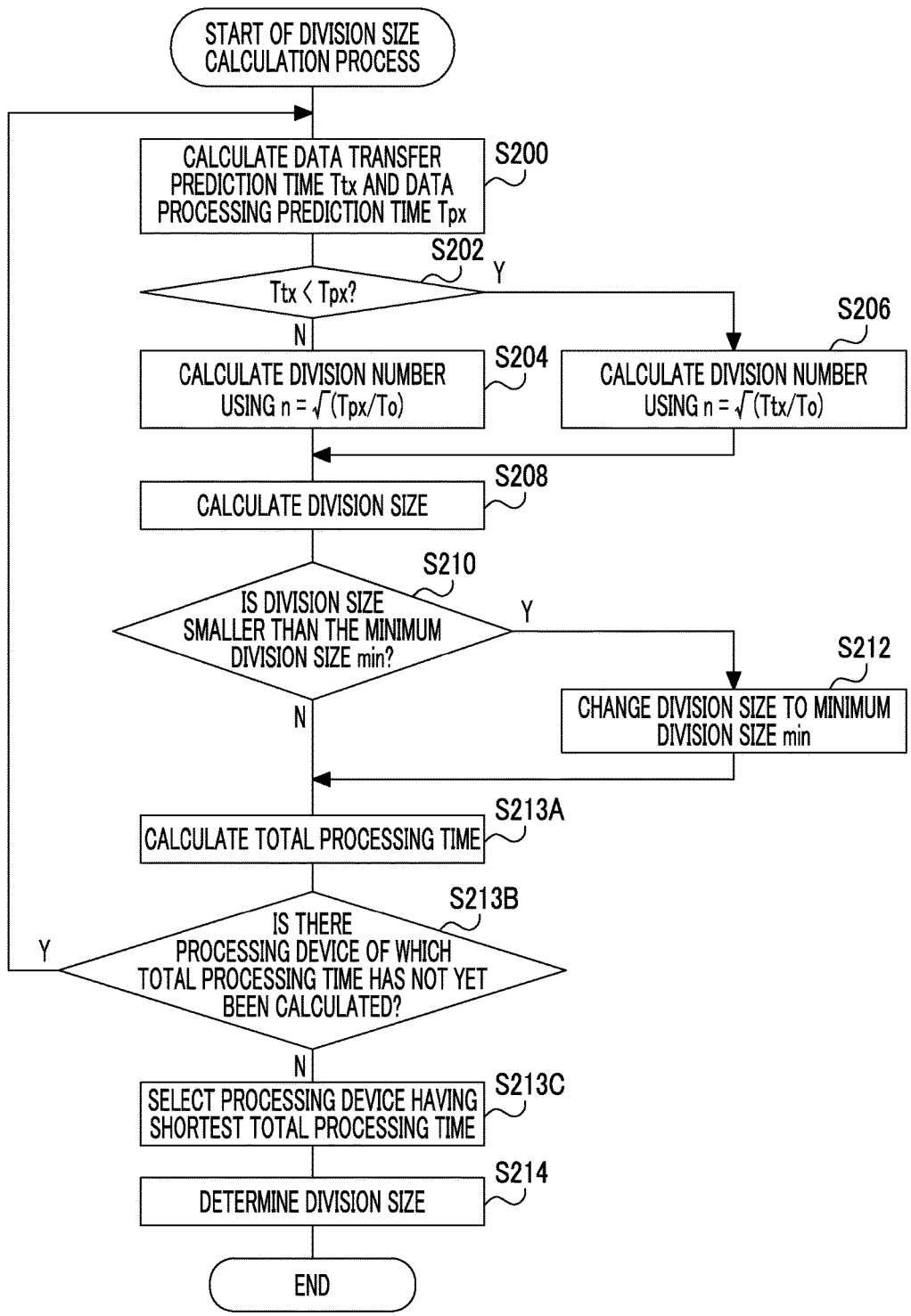
FIG. 13 is a flowchart illustrating an example of a flow of a division size calculation process that is executed by a calculation unit of a planning device according to the second embodiment.

As illustrated in FIG. 13, in the division size calculation process of this embodiment, processes of steps S213A to S213C are added before step S214 to the division size calculation process of the first embodiment.

In step S213A, the calculation unit 44 calculates a total processing time. Here, in a case where the data transfer prediction time Ttx is equal to or longer than the data processing prediction time Tpx, that is, in a case where Ttx≥Tpx, the total processing time is calculated using the Equation (1) above. Further, in a case where the data transfer prediction time Ttx is equal to or less than the data processing prediction time Tpx, that is, in a case where Ttx<Tpx, the total processing time is calculated using Equation (3) above.

In the next step S213B, the calculation unit 44 determines whether or not there is the processing device 30 of which the total processing time has not yet been calculated. In a case where there is a processing device 30 of which the total processing time has not yet been calculated, a positive determination is made, and the process returns to step S200 to repeat this division size calculation process.

On the other hand, in a case where there is no processing device 30 of which the total processing time has not yet been calculated, a negative determination is made, and the process proceeds to step S213C.

In step S213C, the calculating unit 44 selects the processing device 30 having the shortest total processing time, and then, proceeds to step S214.

Thus, in the information processing system 10 according to this embodiment, since a plurality of processing devices 30 are provided, the calculation unit 44 selects the processing device 30 having the shortest total processing time, and the GPU 32 of the selected processing device 30 performs processing instead of the CPU 22 of the control device 20, it is possible to more effectively shorten the total processing time.

As described above, the information processing system 10 according to each of the above-described embodiments includes the control device 20 that transfers the data that is a processing target and the control command describing processing content for the data that is a processing target, the processing device 30 that is provided outside the control device 20 and performs processing according to the control command on input data in a case where the control command is transferred from the control device 20, and the planning device 40 that determines the division size of the data that is a processing target in which a difference between the transfer time to transfer divided data obtained by dividing the data that is a processing target from the control device 20 to the processing device 30 and the processing time to process the divided data in the processing device 30 falls within a predetermined range, on the basis of the amount of data that is a processing target, the transfer time, and the processing time. The control device 20 of the information processing system 10 transfers the divided data obtained by dividing the data that is a processing target according to the division size determined by the planning device 40 to the processing device 30, and the processing device 30 performs processing according to the corresponding control command on the previously transferred divided data in parallel with the transfer of the divided data from the control device 20 to the processing device 30 in a case where the control command is transferred from the control device 20.

Therefore, in the information processing system 10 of each of the above-described embodiments, it is possible to effectively shorten a total time required in a case where the processing is executed by the processing device 30 outside the control device 20.

Figure 14:
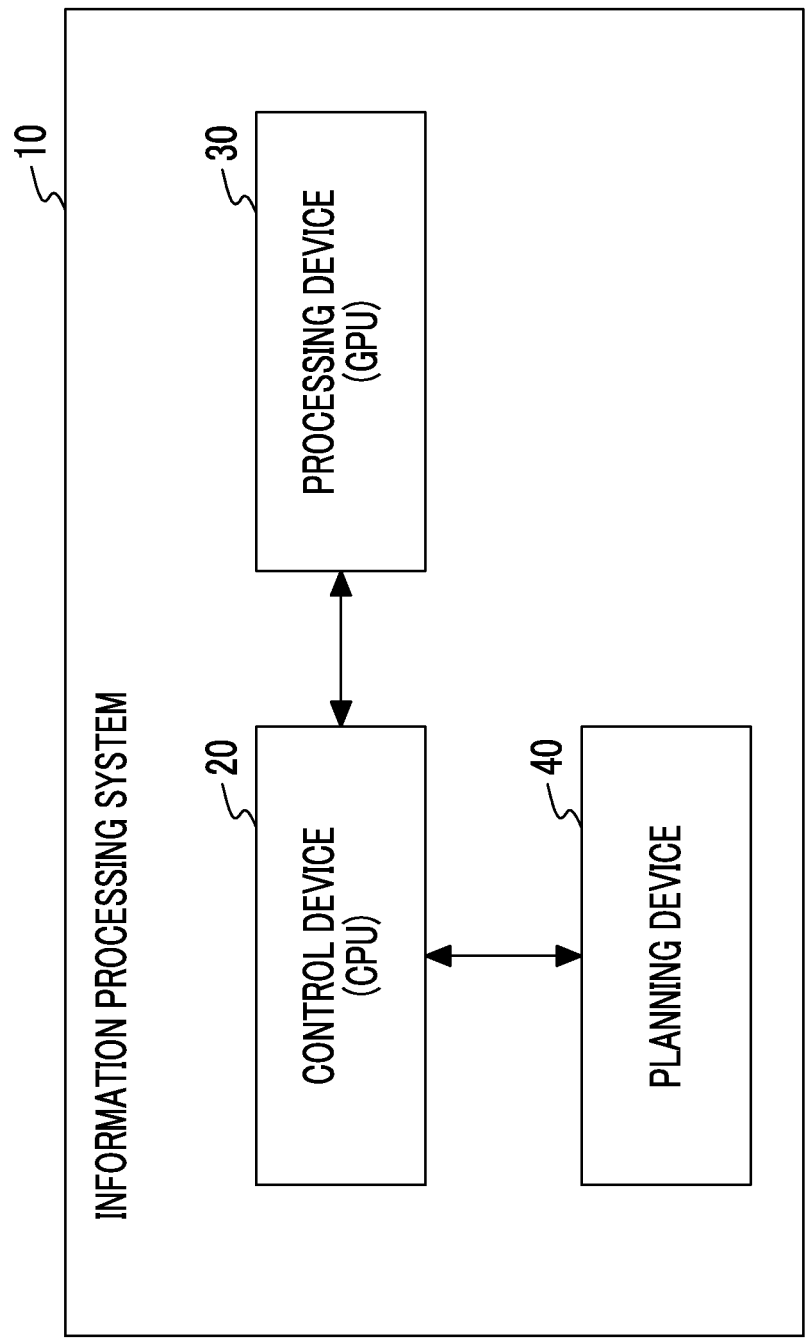
FIG. 14 is a block diagram illustrating a configuration example of another information processing system.

Although the case where the control device 20 includes the CPU 22 and the processing device 30 includes the GPU 32 has been described in each of the above-described embodiments, the CPU 22 itself may be applied as the control device 20, and the GPU 32 itself may be applied as the processing device 30, for example, as illustrated in FIG. 14. Further, the GPU 32 may be a so-called discrete device, or may be a DSP, a CPU, a Xeon Phi (registered trademark), or the like.

Further, in each of the above-described embodiments, the optimum number of divisions n is calculated using Equations (2) and (4), and the optimum division size is determined on the basis of the number of divisions n, but a method of determining the division size is not limited to Equations (2) and (4). The difference between the transfer time to transfer the divided data from the control device 20 to the processing device 30 and the processing time to process the divided data in the processing device 30 may fall within a predetermined range, and the determination method is not particularly limited.

Further, in a case where the information processing system 10 includes a plurality of processing devices 30 and there are a plurality of pieces of data that are processing targets (for example, image data corresponding to a plurality of pages), processing may be executed in parallel by the processing devices 30 different for each data that is a processing target.

Further, in a case where the information processing system 10 includes a plurality of processing devices 30, and different types of processing are continuously performed on data (divided data) that is a processing target, different processing may be sequentially performed by the different processing devices 30. In this case, it is preferable for the planning device 40 to determine the division size on the basis of the processing device 30 having a long processing time among the processing devices 30 that perform different processing.

Further, although the case where the GPU 32 of the processing device 30 performs processing asynchronously with the CPU 22 of the control device 20 has been described in each of the above embodiments, processing may be performed in synchronization with the CPU 22.

Further, the transfer time is based on a transfer rate from the control device 20 to the processing device 30 in a case where the division size is determined in each of the above embodiments, the division size may be determined on the basis of a transfer rate of the processed data in a case where a transfer rate from the processing device 30 to the control device 20 (a rate at which the processed data is transferred) is lower than a transfer rate from the control device 20 to the processing device 30. In this case, a data transfer rate Tt of the setting information 43 stored in the setting information storage unit 42 may be set as the transfer rate at which the processed data is transferred from the processing device 30 to the control device 20.

Further, in a case where the data amount of the processed data to be transmitted from the processing device 30 to the control device 20 is smaller than the divided data, for example, in a case where a process of compressing image data is performed in the processing device 30 and, more specifically, in a case where the data amount is compressed to one fourth, optimization may be performed by reducing the number of times of transmission of the compressed image data from the processing device 30 to the control device 20 to ¼ times and transmitting the image data corresponding to four times to the control device 20.

Further, the configuration, the operation, or the like of the information processing system 10, the control device 20, the processing device 30, the planning device 40, or the like described in each of the above embodiments is an example, and can be appropriately changed without departing from the gist of the present disclosure.

All of the documents, patent applications, and technical standards described in this specification are incorporated by reference herein to the same extent as in a case where each individual document, patent application, and technical standard being incorporated by reference is described specifically and individually.

What is claimed is:

1. An information processing system comprising:
a control device that transfers data that is a processing target and a control command describing processing content for the data;
a plurality of processing devices that are provided outside the control device and perform processing according to the control command on the data in a case where the control command is transferred from the control device; and
a planning device that determines a division size of the data such that a difference between a transfer time to transfer divided data obtained by dividing the data from the control device to each of the plurality of processing devices and a processing time to process the divided data in the processing device falls within a predetermined range, on the basis of an amount of the data, the transfer time, and the processing time,
wherein the control device sequentially transfers the divided data obtained by dividing the data according to the division size determined by the planning device to any one of the plurality of processing devices,
each of the plurality of processing devices performs processing according to the corresponding control command on the previously transferred divided data in parallel with the transfer of the divided data from the control device to the processing device in a case where the control command is transferred from the control device,
the transfer time and the processing time are determined in advance for each of the plurality of processing devices, and
the planning device determines the division size for each of the plurality of processing devices, calculates a processing completion time from start of transfer of the divided data from the control device to each of the plurality of processing devices to end of transfer of all pieces of data obtained by processing the divided data from each of the plurality of processing devices to the control device on the basis of the determined division size, and determines a processing device having a shortest processing completion time to be a transfer destination of the divided data of the control device.

2. The information processing system according to claim 1, wherein the planning device determines the division size to be the minimum value in a case where the determined division size is smaller than a predetermined minimum value.

3. The information processing system according to claim 1,
wherein the planning device determines the division size to be the minimum value in a case where the determined division size is smaller than a predetermined minimum value for each of the plurality of processing devices.

4. The information processing system according to claim 1,
wherein each of the plurality of processing devices transfer the processed data obtained through the processing to the control device, and
the planning device determines a division size of the data in which a difference between the transfer time of the processed data and the processing time falls within a predetermined range in a case where a transfer time of the processed data from the processing device to the control device is longer than a transfer time to transfer the divided data from the control device to the processing device.

5. The information processing system according to claim 1,
wherein the control device is a central processing unit (CPU), and the processing device is a graphics processing unit (GPU).

6. The information processing system according to claim 1,
wherein the divided data is transferred from the control device to the processing device by direct memory access (DMA).

7. The information processing system according to claim 1,
wherein the planning device is included in the control device.

8. An information processing method comprising:
determining, by a planning device, a division size of data that is a processing target such that a difference between a transfer time to transfer divided data obtained by dividing the data from a control device to a processing device provided outside the control device and a processing time to process the divided data in the processing device falls within a predetermined range, on the basis of an amount of the data, the transfer time, and the processing time;
sequentially transferring, by the control device, the divided data obtained by dividing the data according to the division size determined by the planning device and a control command describing processing content for the data to the processing device; and
performing, by the processing device, processing according to the corresponding control command on the previously transferred divided data in parallel with the transfer of the divided data from the control device to the processing device in a case where the control command is transferred from the control device,
wherein a plurality of the processing devices are provided each having the transfer time and the processing time determined in advance, and the method further comprising
determining, by the planning device, the division size for each of the plurality of processing devices, calculating a processing completion time from start of transfer of the divided data from the control device to each of the plurality of processing devices to end of transfer of all pieces of data obtained by processing the divided data from each of the plurality of processing devices to the control device on the basis of the determined division size, and determining a processing device having a shortest processing completion time to be a transfer destination of the divided data of the control device.

9. A non-transitory computer-readable storage medium that stores a program causing a computer to execute information processing, the information processing comprising:
receiving an amount of data that is a processing target and processing content for the data from a control device;
determining a division size of divided data obtained by dividing the data on the basis of a transfer time to transfer the amount of data from the control device to a processing device provided outside the control device and a processing time to execute the processing content for the amount of data, the division size being a size such that a difference between a transfer time to transfer the divided data from the control device to the processing device and a processing time to process the divided data in the processing device falls within a predetermined range;
outputting the division size to the control device;
providing a plurality of the processing devices each having the transfer time and the processing time determined in advance;
determining the division size for each of the plurality of processing devices;
calculating a processing completion time from start of transfer of the divided data from the control device to each of the plurality of processing devices to end of transfer of all pieces of data obtained by processing the divided data from each of the plurality of processing devices to the control device on the basis of the determined division size; and
determining a processing device having a shortest processing completion time to be a transfer destination of the divided data of the control device.

* * * * *